(12) United States Patent
He

(10) Patent No.: US 10,666,447 B2
(45) Date of Patent: May 26, 2020

(54) POWER SOURCING EQUIPMENT, AND METHOD AND APPARATUS FOR POWER OVER ETHERNET

(71) Applicant: Huawei Technologies Co., Ltd., Shenzhen (CN)

(72) Inventor: Ling He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 15/782,598

(22) Filed: Oct. 12, 2017

(65) Prior Publication Data

US 2018/0109391 A1    Apr. 19, 2018

(30) Foreign Application Priority Data

Oct. 13, 2016 (CN) .......................... 2016 1 0895985

(51) Int. Cl.
| | |
|---|---|
| *H04L 12/10* | (2006.01) |
| *G06F 1/26* | (2006.01) |
| *H04L 12/40* | (2006.01) |
| *G05B 7/02* | (2006.01) |
| *H04L 12/12* | (2006.01) |

(52) U.S. Cl.
CPC ................. *H04L 12/10* (2013.01); *G05B 7/02* (2013.01); *G06F 1/26* (2013.01); *H04L 12/12* (2013.01); *H04L 12/40045* (2013.01)

(58) Field of Classification Search
CPC .................................. H04L 12/10; G06F 1/26
See application file for complete search history.

(56) References Cited

U.S. PATENT DOCUMENTS

| | | |
|---|---|---|
| 9,377,794 B1 | 6/2016 | Dwelley et al. |
| 2006/0164775 A1 | 7/2006 | Stineman et al. |
| (Continued) | | |

FOREIGN PATENT DOCUMENTS

| | | |
|---|---|---|
| CN | 103514024 A | 1/2014 |
| CN | 104954145 A | 9/2015 |
| (Continued) | | |

OTHER PUBLICATIONS

Foreign Communication From a Counterpart Application, European Application No. 17196006.5, Extended European Search Report dated Dec. 4, 2017, 7 pages.

(Continued)

*Primary Examiner* — Nitin C Patel
*Assistant Examiner* — Eric Chang
(74) *Attorney, Agent, or Firm* — Conley Rose, P.C.

(57) ABSTRACT

An Ethernet power sourcing equipment (PSE), and a method and an apparatus for power over Ethernet (PoE), where the Ethernet PSE includes a PSE chip, a master control processor, a power supplying port, and a preprocessor. The preprocessor is configured to determine whether the master control processor starts upon power-on, control the PSE chip to detect whether the power supplying port is connected to a valid powered device (PD) when the master control processor starts upon power-on, and control, according to a preset rule, the PSE chip to power on the valid PD when the power supplying port is connected to the valid PD. Hence, the Ethernet PSE has abundant management functions and can quickly power on a PD.

20 Claims, 9 Drawing Sheets

(56) References Cited

U.S. PATENT DOCUMENTS

| | | | |
|---|---|---|---|
| 2009/0327766 A1 | 12/2009 | Ghoshal et al. | |
| 2012/0246458 A1* | 9/2012 | Jain | G06F 1/3253 |
| | | | 713/100 |
| 2014/0142765 A1 | 5/2014 | Gammel | |
| 2016/0127676 A1* | 5/2016 | Seo | H04N 5/63 |
| | | | 348/461 |

FOREIGN PATENT DOCUMENTS

| | | |
|---|---|---|
| CN | 105120112 A | 12/2015 |
| CN | 105323076 A | 2/2016 |
| EP | 2933946 A1 | 10/2015 |
| JP | 2011070261 A | 4/2011 |

OTHER PUBLICATIONS

Machine Translation and Abstract of Japanese Publication No. JP2011070261, Apr. 7, 2011, 42 pages.
Foreign Communication From a Counterpart Application, Japanese Application No. 2017-198117, Japanese Office Action dated Aug. 14, 2018, 3 pages.
Foreign Communication From a Counterpart Application, Japanese Application No. 2017-198117, English Translation Df Japanese Office Action dated Aug. 14, 2018, 3 pages.

* cited by examiner

POWER SOURCING EQUIPMENT, AND METHOD AND APPARATUS FOR POWER OVER ETHERNET

CROSS-REFERENCE TO RELATED APPLICATION

This application claims priority to Chinese Patent Application No. 201610895985.8 filed on Oct. 13, 2016, which is hereby incorporated by reference in its entirety.

TECHNICAL FIELD

The present disclosure relates to the field of power over Ethernet (PoE), and in particular, to power sourcing equipment (PSE), and a method and an apparatus for PoE.

BACKGROUND

PoE is a technology that when an existing Ethernet cabling infrastructure is not modified, when a data signal is transmitted for some devices such as an Internet Protocol (IP) telephone, an access point (AP), and a network camera, a direct current can be supplied to these devices at the same time.

Generally, a PoE system mainly includes PSE and a powered device (PD). The PSE mainly includes a master control chip (master control) and a PSE chip, and a power supplying process of the PSE chip may be generally divided into five parts: PD detection, classification, power-on, normal power supplying, and power-off. The PSE chip first detects whether the PD is valid, then classifies the PD to determine power consumption, and powers on the PD after completion of the classification to start to supply power. During normal power supplying, the PSE chip continuously monitors a current of the PD, and when PD power consumption encounters overload or short circuit, or exceeds power supplying load of the PSE chip, the PSE chip disconnects a power supply and starts a next round of a detection process.

In the PSE of the existing PoE system, the master control manages the PSE chip using an inter-integrated circuit (IIC) bus, one PSE chip may supply power to multiple PoE ports, and each PoE port may connect to one PD. The PSE chip has four modes: an off mode in which no action is performed, a manual mode in which an external program may trigger and control detection, classification, and power-on. A semi auto mode in which detection and classification are automatically performed and the external program may control power-on, and an auto mode in which detection, classification, and power-on are automatically performed. The master control is responsible for a function such as remote management, coordination between PSE chips, power-on and power-off of a non-standard PD, or power supply management. After power is turned on, the PSE chip is in the off mode and waits for the master control to start. After the master control starts, the PSE chip is initialized and is configured to be in the semi auto mode. In this case, the PSE chip starts, under management of the master control, detection, classification, and power supplying, and the master control is further responsible for a function of PoE overall management.

Generally, a startup upon power-on process of the PSE is shown in FIG. 1. After the PSE is connected to the power supply, a central processing unit (CPU) of the master control first runs boot (BOOT) of a basic input/output system (BIOS) and initializes a double data rate (DDR) synchronous dynamic random access memory (SDRAM) to obtain relatively large memory usage space. After initialization is completed, the BIOS/BOOT checks whether a system needs to be upgraded. The BIOS/BOOT obtains a startup file using an Ethernet port, a serial port, or a local flash memory, loads an operating system (OS) from the startup file, and starts a main program if the system does not need to be upgraded, and the main program initializes various components and configures the PSE chip to be in the semi auto mode. The PSE can properly supply power under the management of the master control only after startup of the main program is completed. The main program of the master control provides abundant management functions. A user may check a port state, set a PoE alarm, set reserved power, perform forced power-on or power-off, and so on by logging in to the master control.

However, in other approaches, though the master control can flexibly manage the PD device, a startup time of the PoE system is long and a power supply speed is low, because the PD cannot obtain power before the master control completely starts, and after the master control is powered off, if power supplying is resumed, it takes a very long time for an entire network including the PD to return to normal.

SUMMARY

Embodiments of the present disclosure provide PSE, and a method and an apparatus for PoE to resolve a problem of a low power supplying speed when PoE has a function of master control management.

According to a first aspect, an embodiment of the present disclosure provides PSE, including a PSE chip, a master control unit, and a power supplying port, and further including a preprocessing unit, where the preprocessing unit is configured to determine whether the master control unit starts upon power-on, control the PSE chip to detect whether the power supplying port is connected to a valid PD if the master control unit starts upon power-on, and control, according to a preset rule, the PSE chip to power on the valid PD when the power supplying port is connected to the valid PD.

In a possible design, in the PSE, the master control unit is configured to determine whether the PSE chip has supplied power to a PD, obtain state information of the PSE chip if the PSE chip has supplied power to the PD, or initialize the PSE chip if the PSE chip has not supplied power to the PD, and complete system configuration according to a pre-stored configuration rule.

In a possible design, a volatile memory is disposed in the master control unit, or the volatile memory is connected to the master control unit. The master control unit detects the volatile memory, the preprocessing unit obtains a detection result of the connected master control unit, and determines, according to the detection result, whether the master control unit starts upon power-on. Alternatively, the preprocessing unit is directly connected to the volatile memory, and determines, by detecting whether data in the volatile memory disappears, whether the master control unit starts upon power-on. In another possible design, the master control unit calculates a logical result according to a clock signal, a reset signal, a related state parameter, or the like and using a preset logical algorithm, and the preprocessing unit obtains the logical result calculated by the connected master control unit, and determines, according to the logical result, whether the master control unit starts upon power-on. Alternatively, the preprocessing unit obtains a clock signal, a reset signal, a related state parameter, or the like of the connected master control unit, and calculates a logical result using a preset logical algorithm so as to determine whether the master control unit starts upon power-on. In the latter startup upon power-on determining method, no new hardware is added, and hardware consumption can be saved.

In a possible design, when controlling, according to the preset rule, the PSE chip to power on the valid PD, the preprocessing unit is further configured to obtain total output power of a power supply for a PD, obtain agreed power of each PD, determine a to-be-powered-on PD according to the total output power and the agreed power of each PD, and control the PSE chip to power on the to-be-powered-on PD. In a possible design, determining a to-be-powered-on PD according to the total output power and the agreed power and controlling the PSE chip to power on the to-be-powered-on PD include determining whether a sum of agreed power of all PDs is greater than the total output power, determining, according to a preset sequence, whether agreed power of an $n^{th}$ PD is less than a difference between the total output power and agreed power of all powered-on PDs if the sum of the agreed power of all the PDs is greater than the total output power, controlling the PSE chip to power on the $n^{th}$ PD, and letting n=n+1 if the agreed power of the $n^{th}$ PD is less than the difference, determining whether n is less than or equal to m, going back to a step of determining whether agreed power of an $n^{th}$ PD is less than a difference between the total output power and agreed power of all powered-on PDs if n is less than or equal to m, terminating a power-on process if n is greater than m, terminating the power-on process if the agreed power of the $n^{th}$ PD is greater than or equal to the difference, and controlling, according to the preset sequence, the PSE chip to power on the PD if the sum of the agreed power of all the PDs is less than or equal to the total output power, where n is a natural number, and m is a total quantity of PDs whose agreed power is obtained by the preprocessing unit. It is determined whether n is less than m. If n is greater than m, the power-on process is terminated so as to prevent infinite loop that is of the power-on process and that is caused by hot-plugging a PD in the power-on process. Alternatively, a step of determining whether n is less than m may not be added, and a value of n is specified as 1 to m−1 in order to prevent the infinite loop of the power-on process.

Running of a preprocessing unit is independent from running of a master control unit, and running is started after it is determined that the master control unit starts upon power-on. Therefore, PSE can supply power to a PD without waiting for completion of startup of a main program in the master control unit such that the PSE can quickly power on the PD. After the master control unit completes startup of the main program, because a basic power-on process is completed by the preprocessing unit, the master control unit does not perform a conventional process of setting a PSE chip to be in a semi auto mode to power on the PD, but reads configuration information of the PSE chip and determines, according to the configuration information, whether the PSE chip has supplied power to the PD. If the PSE chip has supplied power to the PD, the master control unit obtains state information of the PSE chip as a start state for subsequently controlling the PSE chip. If the PSE chip has not supplied power to the PD, the master control unit initializes the PSE chip and completes entire system configuration according to a pre-stored configuration rule. The preprocessing unit no longer works after power-on of the PD is completed, and the master control unit replaces the preprocessing unit to control the PSE chip. Abundant management functions may be configured for a PoE system using the master control unit, facilitating flexible control of PoE system power supplying.

In a possible design, in the PSE, the preprocessing unit and the master control unit run in a master control, and the preprocessing unit runs before the master control unit loads or jumps to a main program. In another possible design, the master control unit runs in a master control, the preprocessing unit runs in a microcontroller (MCU) that is independent of the master control, and the MCU is connected to the power supply and the PSE chip. Integrating the preprocessing unit and the master control unit into the master control helps reduce a hardware device, but increases pressure on a CPU of the master control. Independently running the preprocessing unit and the master control unit in an MCU and the master control respectively increases the hardware device, but reduces the pressure on the CPU of the master control.

According to a second aspect, an embodiment of the present disclosure provides a method for PoE, including determining, by a preprocessing unit, whether a master control unit starts upon power-on, controlling a PSE chip to detect whether a power supplying port is connected to a valid PD if the master control unit starts upon power-on, and controlling, according to a preset rule, the PSE chip to power on the valid PD when the power supplying port is connected to the valid PD.

In a possible design, the method for PoE further includes determining, by the master control unit, whether the PSE chip has supplied power to a PD, obtaining state information of the PSE chip if the PSE chip has supplied power to the PD, or initializing the PSE chip if the PSE chip has not supplied power to the PD, and completing system configuration according to a pre-stored configuration rule.

In a possible design, powering on, by the preprocessing unit, the valid PD according to a preset rule includes obtaining total output power of the power supply for a PD, obtaining agreed power of each PD, determining a to-be-powered-on PD according to the total output power and the agreed power of each PD, and controlling the PSE chip to power on the to-be-powered-on PD. Further, in a possible design, powering on, by the preprocessing unit, the PD according to a preset rule includes obtaining total output power of a power supply for a PD, obtaining agreed power of all valid PDs, where the agreed power is determined according to a power class of the PD, calculating a sum of agreed power of all the PDs, determining whether the sum of the agreed power is less than or equal to the total output power of the power supply, sequentially controlling, according to a random sequence or a preset sequence, the PSE chip to power on the PD if the sum of the agreed power is less than or equal to the total output power, determining, by the preprocessing unit according to the preset sequence, whether agreed power of an $n^{th}$ PD is less than remaining power if the sum of the agreed power is greater than the total output power, where the remaining power=the total output power of the power supply−agreed power of all powered-on PDs, and controlling the PSE chip to power on the $n^{th}$ PD, letting n=n+1, and going back to a step of determining whether agreed power of an $n^{th}$ PD is less than remaining power if the agreed power of the $n^{th}$ PD is less than the remaining power, where n is a natural number, n=1, 2, . . . , m−1, and m is a total quantity of PDs whose agreed power is obtained by the preprocessing unit.

According to a third aspect, an embodiment of the present disclosure provides an apparatus for PoE. The apparatus for PoE is configured to execute the method for PoE in the second aspect of the present disclosure, the apparatus for PoE includes a master control module and a preprocessing module, and the preprocessing module includes a startup upon power-on determining submodule configured to determine whether a master control starts upon power-on, a PSE control submodule configured to control a PSE chip to detect whether a power supplying port is connected to a valid PD if the master control starts upon power-on, and a power-on control submodule configured to control, according to a preset rule, the PSE chip to power on the valid PD when determining that the power supplying port is connected to the valid PD.

In a possible design, in the apparatus for PoE, the master control module includes a power supplying determining submodule configured to determine whether the PSE chip has supplied power to a PD, a PSE state information reading submodule configured to obtain state information of the PSE chip if the PSE chip has supplied power to the PD, a PSE initialization submodule configured to initialize the PSE chip if the PSE chip has not supplied power to the PD, and a system configuration submodule configured to complete system configuration according to a pre-stored configuration rule.

In a possible design, the preprocessing module and the master control module are installed in the master control, and the preprocessing module runs before the master control module loads or jumps to a main program. In another possible design, the master control module is installed in the master control, the preprocessing module is installed in an MCU that is independent of the master control, and the MCU is connected to a power supply and the PSE chip.

According to the technical solutions provided in the embodiments of the present disclosure, a preprocessing unit is added to PSE in a PoE system, and the preprocessing unit can start running after a master control unit starts upon power-on. After a master control unit system starts upon power-on, the preprocessing unit controls a PSE chip to detect whether a power supplying port is connected to a valid PD. When determining that the power supplying port is connected to the valid PD, the preprocessing unit controls, according to a preset rule, the PSE chip to power on the PD. The PSE can power on the PD without waiting for obtaining a startup file by the master control unit, loading an OS from the startup file, starting a main program, and initializing all components by the main program such that the PoE system can quickly power on the PD. In addition, according to the technical solutions provided in the embodiments of the present disclosure, the master control unit of the PSE is reserved. Abundant management functions may be configured for the Ethernet PSE using the master control unit, and flexibility and security of power supplying are increased.

BRIEF DESCRIPTION OF DRAWINGS

To describe the technical solutions in the embodiments of the present disclosure more clearly, the following briefly describes the accompanying drawings required for describing the embodiments. A person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

A main principle of the present disclosure is reserving a master control unit of PSE in a common PoE system and adding a preprocessing unit. After the PSE starts upon power-on, the preprocessing unit first controls a PSE chip to detect validity of a PD, for example, sets the PSE chip to be in a semi auto mode. The PSE chip automatically completes the PD detection, and the preprocessing unit controls the PSE chip to power on a valid PD. The master control unit completes a job such as starting BIOS/BOOT, starting a main program, initializing a component, configuring a system, or the like step by step. In addition, because the PSE chip may have powered on the PD under the control of the preprocessing unit, system configuration by the master control unit may be different from that in a common case without the preprocessing unit. By reserving the master control unit and adding the preprocessing unit, not only the PoE system can have abundant management functions, but also a power supplying speed and efficiency of the PSE can be increased.

In a hardware framework of the PSE in the present disclosure, the master control unit may be a master control, that is, the master control is used as a carrier to run a related program module of the master control unit and complete a function of the master control unit. The master control unit and the preprocessing unit may be integrated into the master control, such as a CPU, and the master control completes a function of the master control unit and the preprocessing unit. The preprocessing unit and the master control unit may further be disposed in different chips, for example, the master control unit is disposed in the master control, and the preprocessing unit is disposed in an MCU.

Figure 1:
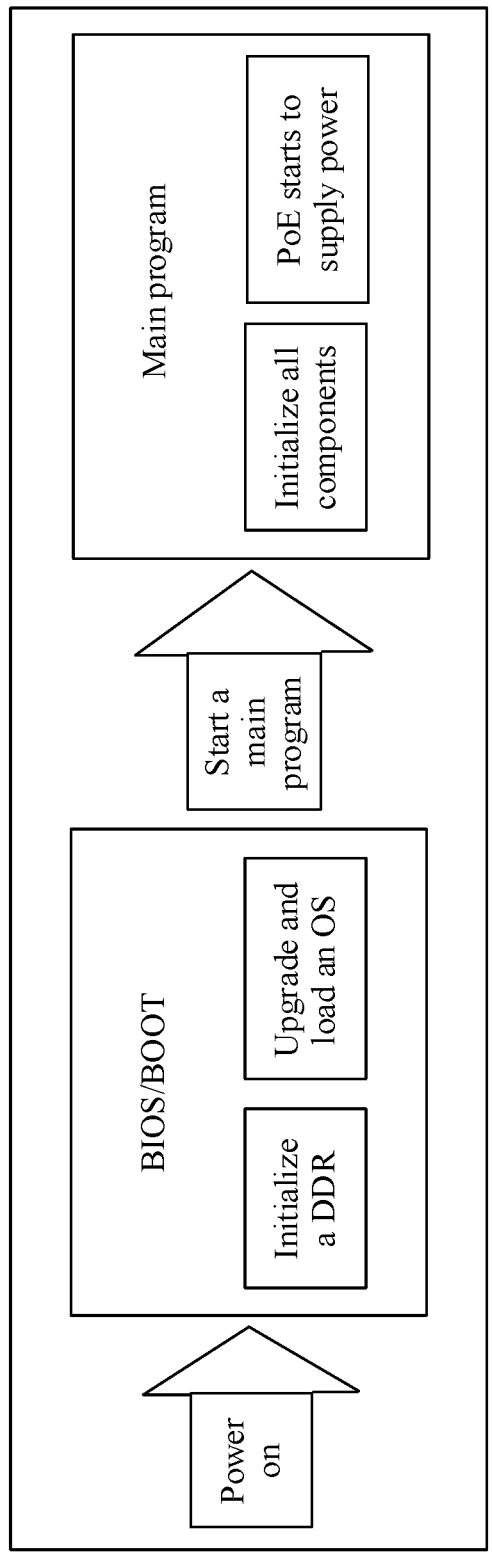
FIG. 1 is a schematic diagram of a startup upon power-on process of an Ethernet PSE.
Figure 2:
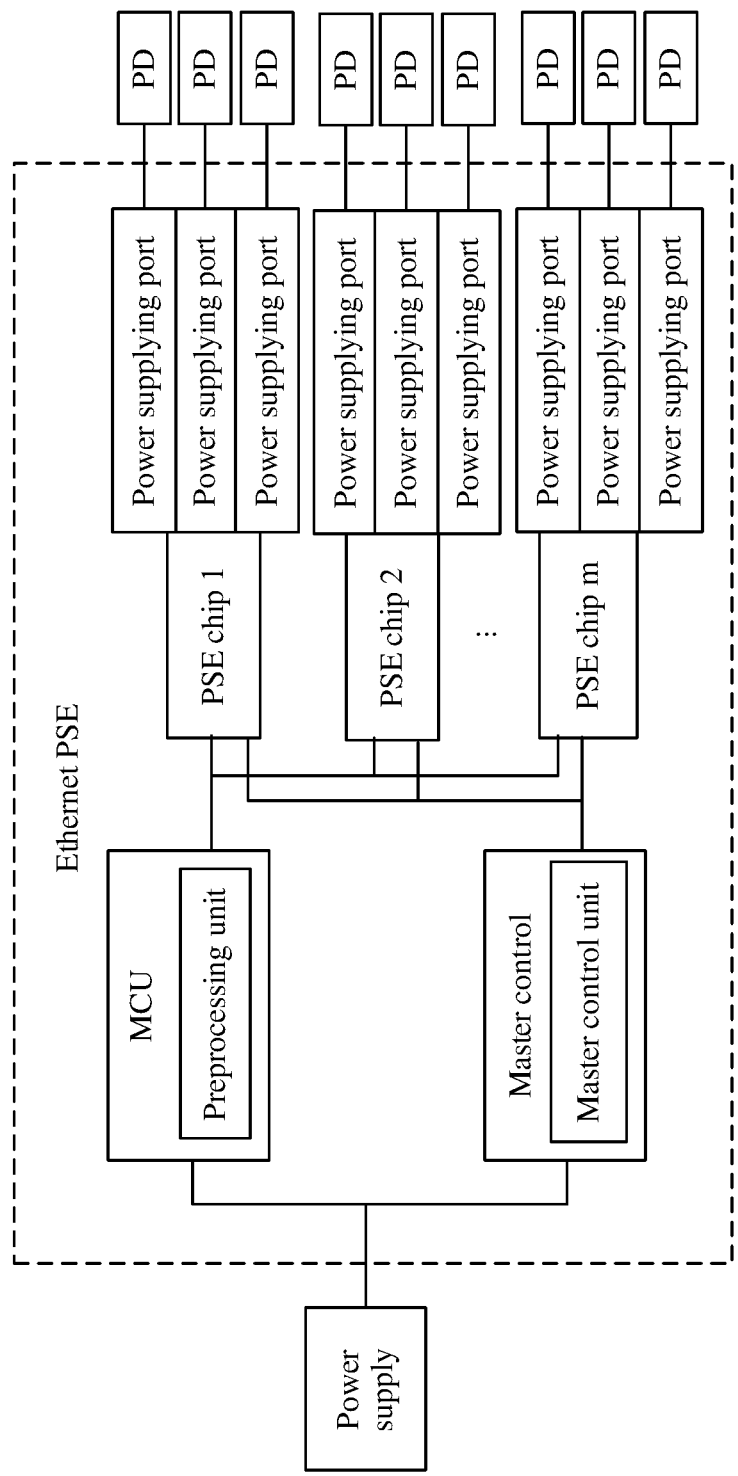
FIG. 2 is an example diagram of a system framework according to the present disclosure.

FIG. 2 shows an example diagram of a system framework according to the present disclosure. As shown in FIG. 2, as a whole, a PoE system includes a power supply, a PSE chip, a PD, a master control unit, and a preprocessing unit. The PSE chip, the master control unit, and the preprocessing unit belong to PSE. The master control unit runs in the master control, and the preprocessing unit runs in an MCU. The power supply is connected to the master control and the MCU in order to supply power to the PSE chip, the master control, and the MCU, and supply power to the PD using the PSE chip. In a possible implementation, the power supply may be configured to supply power only to the PD using the PSE chip, and power of the PSE chip, the master control, and the MCU is supplied using a self-provided power supply. The master control that carries the master control unit is connected to the power supply and the PSE chip, and the MCU that carries the preprocessing unit is connected to the power supply and the PSE chip. It should be noted that power of the PSE chip may be supplied by the master control or the MCU, or may be directly supplied by the power supply. In FIG. 2, the PSE chip is connected to the master control and the MCU, the master control supplies power (the MCU no longer needs to supply power to the PSE), and the PSE chip exchanges signals with the master control and the MCU. A signal line that connects the PSE chip and the master control has functions of supplying power and exchanging signals, and a signal line that connects the PSE chip and the MCU has only a function of exchanging signals. All PSE chips in FIG. 2 are multichannel PSE chips, and each PSE chip may be connected to multiple PDs using a power supplying port.

The preprocessing unit is configured to perform the following steps.

Step (a1): Determine whether the master control unit starts upon power-on.

Step (a2): Control the PSE chip to detect whether the power supplying port is connected to a valid PD if the master control unit starts upon power-on.

Step (a3): Control, according to a preset rule, the PSE chip to power on the valid PD when the power supplying port is connected to the valid PD.

A volatile memory may be disposed in the master control unit, or the volatile memory may be connected to the master control unit. Data stored in the volatile memory disappears after the master control unit is powered off. It is determined, by detecting whether the data in the volatile data disappears, whether the master control unit starts upon power-on. If the data in the volatile memory disappears, it indicates that the master control unit is powered off, startup that is being performed is startup upon power-on, and the master control unit rewrites data into the volatile memory after startup upon power-on. The master control unit is not powered off, and startup upon power-on does not need to be performed if the data in the volatile memory always exists and does not disappear. The master control unit may detect the volatile memory. The preprocessing unit is connected to the master control unit, obtains a detection result of the master control unit, and determines, according to the detection result, whether the master control unit starts upon power-on. Alternatively, the preprocessing unit is directly connected to the volatile memory, and determines, by detecting the data in the volatile memory, whether the master control unit starts upon power-on.

However, disposing the volatile memory increases hardware consumption, and installation is inconvenient. Therefore, the master control unit calculates a logical result according to a clock signal, a reset signal, a related state parameter, or the like and using a preset logical algorithm, and the preprocessing unit may obtain the logical result calculated by the connected master control unit, and determine, according to the logical result, whether the master control unit starts upon power-on. Alternatively, the preprocessing unit obtains a clock signal, a reset signal, a related state parameter, or the like of the connected master control unit, and the preprocessing unit calculates a logical result using a preset logical algorithm so as to determine whether the master control unit starts upon power-on.

If the master control unit starts upon power-on, the preprocessing unit controls the PSE chip to detect whether the power supplying port is connected to the valid PD. The preprocessing unit may set the PSE chip to be in a semi auto mode. The PSE chip in the semi auto mode automatically detects validity of the PD connected to the power supplying port, or automatically detects validity of the connected PD and performs physical layer classification on the valid PD. However, power supplying to the PD is manual, and the manual means that an external program controls power supplying to the PD. In the present disclosure, the preprocessing unit controls PDs whose power is supplied by the PSE chip and a rule for power supplying to the PD. The preprocessing unit may alternatively set the PSE chip to be in a manual mode, the preprocessing unit controls the PSE chip to detect whether the power supplying port is connected to the valid PD, and the preprocessing unit may control, according to a requirement, the PSE chip to perform physical layer classification on the valid PD.

The valid PD is a PD that complies with a preset standard. The PSE chip inputs detection voltage to the power supplying port, detects impedance of the power supplying port, determines, according to the detected impedance, whether the power supplying port is connected to the valid PD, and obtains a detection result. If the detected impedance meets a requirement, the power supplying port is connected to the valid PD, otherwise, if the detected impedance does not meet a requirement, the power supplying port is not connected or is connected to an invalid PD. For the valid PD, the PSE chip determines a power class of the valid PD. The PSE chip may specify the power class of the valid PD, for example, set by default, according to a power supplying capability of the power supply and power consumption of the connected PD, a power class of a valid PD connected to one or some power supplying ports. Alternatively, the PSE chip performs physical layer classification on the PD. The PSE chip may apply classification voltage on the PD and receive a classification current emitted by the PD in order to determine maximum power that can be consumed by the PD, and determine the power class of the PD according to the maximum power, such as class 1 or class 2. For example, the PSE first applies classification voltage from 14.5 V to 20.5 V on the PD, the PD returns a classification current, and the classification current indicates, to the PSE, maximum power that can be consumed by the PD, that is, indicates a power class of the PD.

Figure 3:
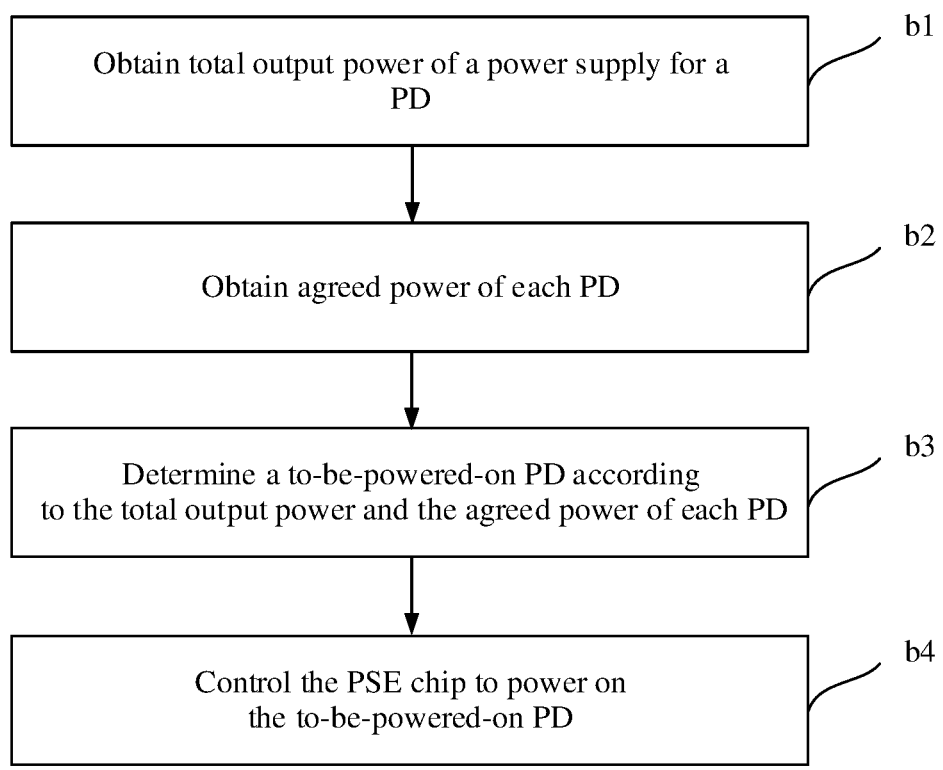
FIG. 3 is an example of a schematic flowchart for a preprocessing unit to control, according to a preset rule, a PSE chip to power on a PD.

After the PSE chip completes PD detection and determines that the power supplying port is connected to the valid PD, or completes the PD detection (determining that the power supplying port is connected to the valid PD) and completes physical layer classification, the preprocessing unit controls, according to the preset rule, the PSE chip to power on the valid PD. As shown in FIG. 3, step (a3) may include the following steps.

Step (b1): Obtain total output power of a power supply for a PD.

Step (b2): Obtain agreed power of each PD.

Step (b3): Determine a to-be-powered-on PD according to the total output power and the agreed power of each PD.

Step (b4): Control the PSE chip to power on the to-be-powered-on PD.

The preprocessing unit may read a power parameter of the power supply to obtain the total output power of the power supply for the PD. The total output power is maximum power when the power supply can supply power to all PDs and does not include power consumption for supplying power to the PSE chip, the master control, and the MCU. The preprocessing unit may further obtain agreed power of the PD connected to the power supplying port, and the agreed power is determined according to the power class of the PD.

Figure 4:
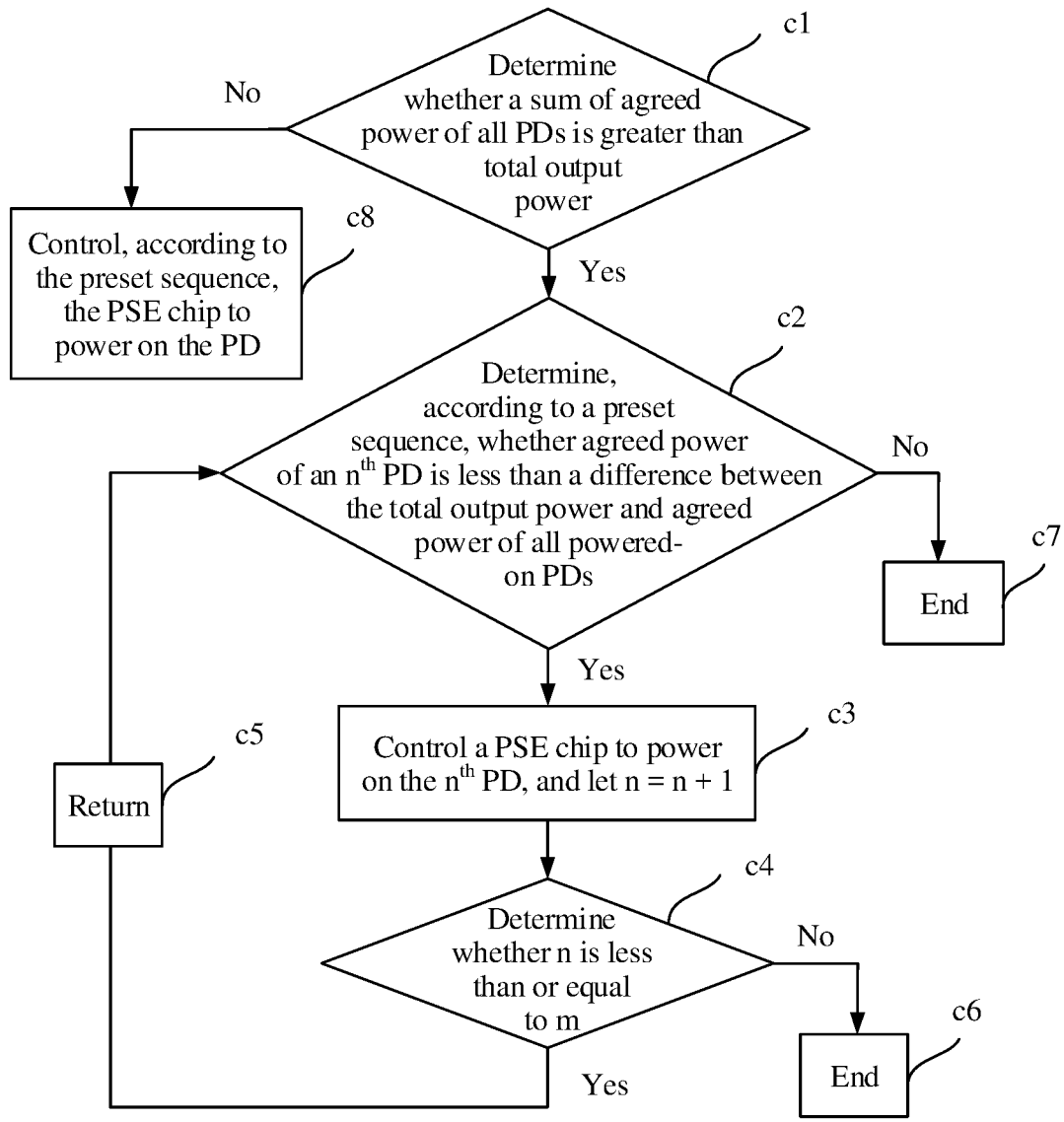
FIG. 4 is a schematic flowchart of an implementation of steps (b3) and (b4) in FIG. 3.

As shown in FIG. 4, steps (b3) and (b4) may further include the following steps.

Step (c1): Determine whether a sum of agreed power of all PDs is greater than the total output power. Perform step (c2) if the sum of the agreed power of all the PDs is greater than the total output power, and perform (c8) if the sum of the agreed power of all the PDs is less than or equal to the total output power.

Step (c2): Determine, according to a preset sequence, whether agreed power of an $n^{th}$ PD is less than a difference between the total output power and agreed power of all powered-on PDs. Perform step (c3) if the agreed power of the $n^{th}$ PD is less than the difference, and perform step (c7) if the agreed power of the $n^{th}$ PD is greater than or equal to the difference.

Step (c3): Control the PSE chip to power on the $n^{th}$ PD, and let n=n+1.

Step (c4): Determine whether n is less than or equal to m.

Step (c5): If n is less than or equal to m, return to step (c2).

Step (c6): If n is greater than m, end a power-on process.

Step (c7): End the power-on process.

Step (c8): Control, according to the preset sequence, the PSE chip to power on the PD.

Where n is a natural number, and m is a total quantity of PDs whose agreed power is obtained by the preprocessing unit.

After obtaining the agreed power of each PD, the preprocessing unit calculates the sum of the agreed power of all the PDs, and determines whether the sum of the agreed power is greater than the total output power of the power supply for the PD. If the sum of the agreed power is less than or equal to the total output power, it indicates that the power supply can support power consumption of all the PDs, each PD can be powered on, each PD is a to-be-powered-on PD, and therefore the preprocessing unit can directly power on all the PDs. Power-on of the PD may be sequential power-on according to a preset sequence, the sequence is determined according to a power supplying priority of the PD, and the power supplying priority is preset by a user according to a factor such as an importance degree of the PD or a power supplying time. Power-on of the PD may not be performed according to the sequence, and the preprocessing unit may power on all the PDs simultaneously or according to a randomly generated sequence. The controlling the PSE chip to power on the PD may be enabling, by the preprocessing unit, a power supplying switch of the PSE chip.

If the sum of the agreed power is greater than the total output power, it indicates that the power supply can support power consumption of only some PDs. In this case, the PD is powered on according to the preset sequence. Further, for each PD whose agreed power is obtained according to the preset sequence, the preprocessing unit first determines whether remaining power is greater than agreed power of a current to-be-supplied-power PD. If the remaining power is greater than the agreed power of the current to-be-supplied-power PD, the PSE is controlled to power on the current to-be-supplied-power PD, and it is determined, using a next PD as the current to-be-supplied-power PD, whether the agreed power of the current to-be-supplied-power PD is less than the remaining power. Otherwise, if the remaining power is less than or equal to the agreed power of the to-be-supplied-power PD, it indicates that the remaining power cannot support a power requirement of the to-be-supplied-power PD, and therefore the power-on process is terminated. In a process of powering on the PD by the preprocessing unit according to the preset sequence, hot-plugging a PD may occur. If a PD connected to the power supplying port is hot-unplugged, the total quantity m of the PDs may be decreased. In addition, if agreed power of the removed PD is high, but a sum of agreed power in a process of controlling, by the preprocessing unit, the PSE chip to perform power-on this time is determined, the sum of the agreed power of all the connected PDs may be actually less than the total output power after the PD is hot-unplugged, and infinite loop of a sequential power-on process by the preprocessing unit may be caused. Therefore, it is determined whether the agreed power of the $n^{th}$ PD is less than the difference between the total output power and the agreed power of all the powered-on PDs. If the agreed power of the $n^{th}$ PD is less than the difference, the PSE chip is controlled to power on the $n^{th}$ PD, and after it is assumed that n=n+1, it is determined whether n is less than m. If n is greater than m, the power-on process is terminated so as to prevent infinite loop of the power-on process. Alternatively, a step of determining whether n is less than m may not be added, and a value of n is specified as 1 to m−1 in order to prevent the infinite loop of the power-on process.

The remaining power=the total output power of the power supply−the agreed power of all the powered-on PDs before the current to-be-supplied-power PD. It should be noted that, to prevent a device from running at a boundary, when the remaining power is equal to the agreed power of the to-be-supplied-power PD, it is also considered that the remaining power cannot support the power requirement of the to-be-supplied-power PD.

If the power supply has quite high total output power and can supply power to any PD connected to all power supplying ports, that the preprocessing unit controls, according to the preset rule, the PSE to power on the valid PD may alternatively be that after the validity of the PD is detected, the PSE is controlled, directly according to a random sequence or the preset sequence or at the same time to power on the valid PD, and a process from steps (c1) to (c8) is not required. The preset sequence may be determined by the user according to the power supplying priority of the PD, and the power supplying priority is determined by the user according to the factor such as the importance degree of the PD or the power supplying time.

If the power supplying port is not connected to the valid PD, the preprocessing unit terminates a power supplying process.

Because in an MCU, running of a preprocessing unit is independent from running of a master control unit, and running can be started after the master control unit starts upon power-on, PSE in a PoE system does not need to wait for completion of a process such as obtaining a startup file by the master control unit, loading an OS from the startup file, starting a main program, or initializing all components by the main program, and the preprocessing unit can complete a process of detection, classification, and power supplying. Therefore, the PSE can quickly power on a PD. After the master control unit completes startup of the main program, because a basic power-on process is completed by the preprocessing unit, the master control unit does not perform a conventional process of setting a PSE chip to be in a semi auto mode to power on the PD, but reads configuration information of the PSE chip and determines, according to the configuration information, whether the PSE chip has supplied power to the PD. If the PSE chip has supplied power to the PD, the master control unit obtains state information of the PSE chip, such as a power class or current sizes of a current and voltage, and records and saves the state information as a start state for subsequently controlling the PSE chip. If the PSE chip has not supplied power to the PD, the master control unit subsequently initializes the PSE chip, sets these PSEs to be in a semi auto mode when required, controls the PSE to power on the PD, and completes entire system configuration according to a pre-stored configuration rule. The system configuration includes setting whether it is required to power on a non-standard PD, whether to permit a high inrush current at a power-on moment, whether to power off when the PD is idle, or the like. The preprocessing unit no longer works after power-on of the PD is completed, and the master control unit totally controls the PSE chip. Abundant management functions can be configured for the PoE system using the master control unit, better facilitating flexible control and processing of PoE system power supplying.

Figure 5:
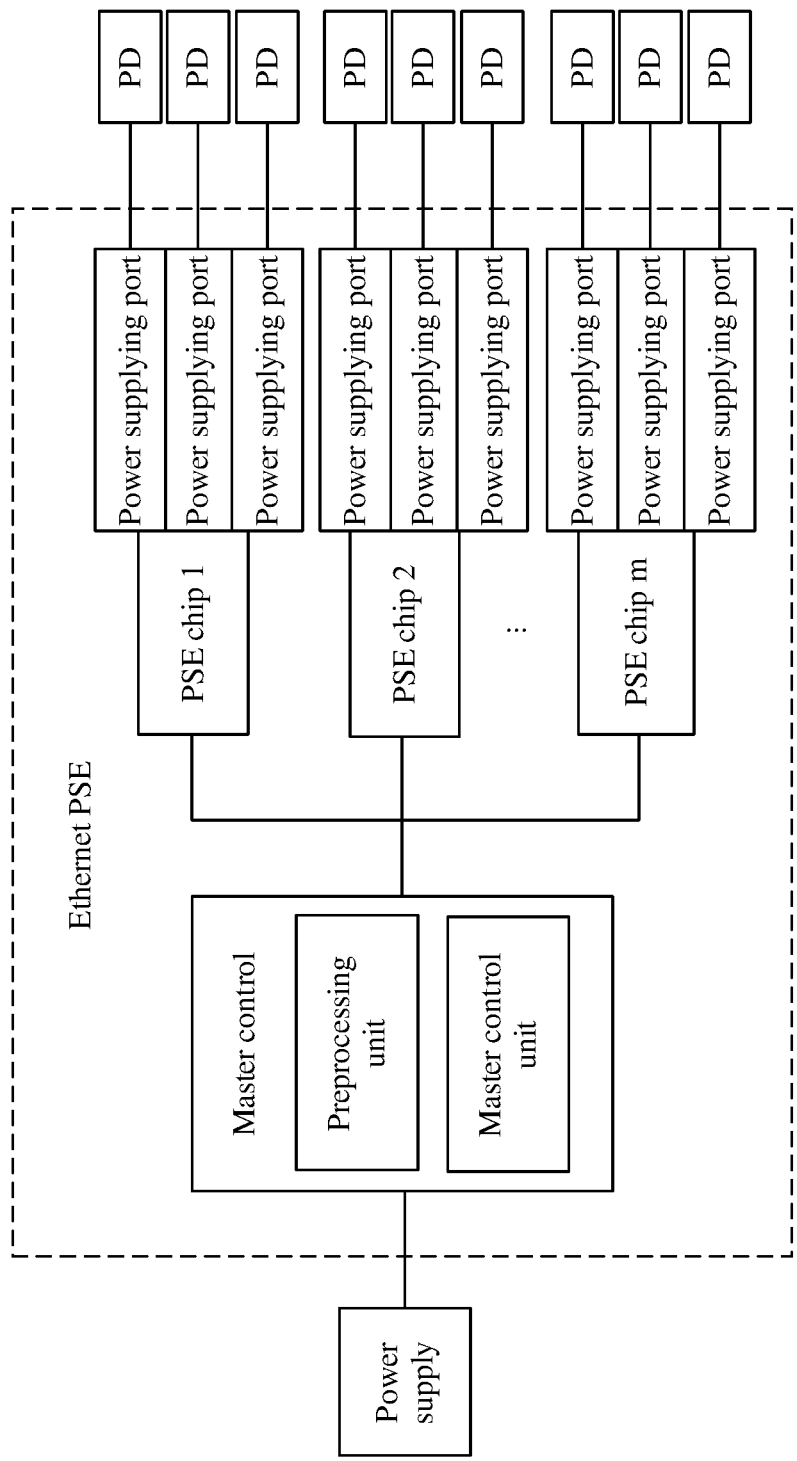
FIG. 5 is another example diagram of a system framework according to the present disclosure.
Figure 6:
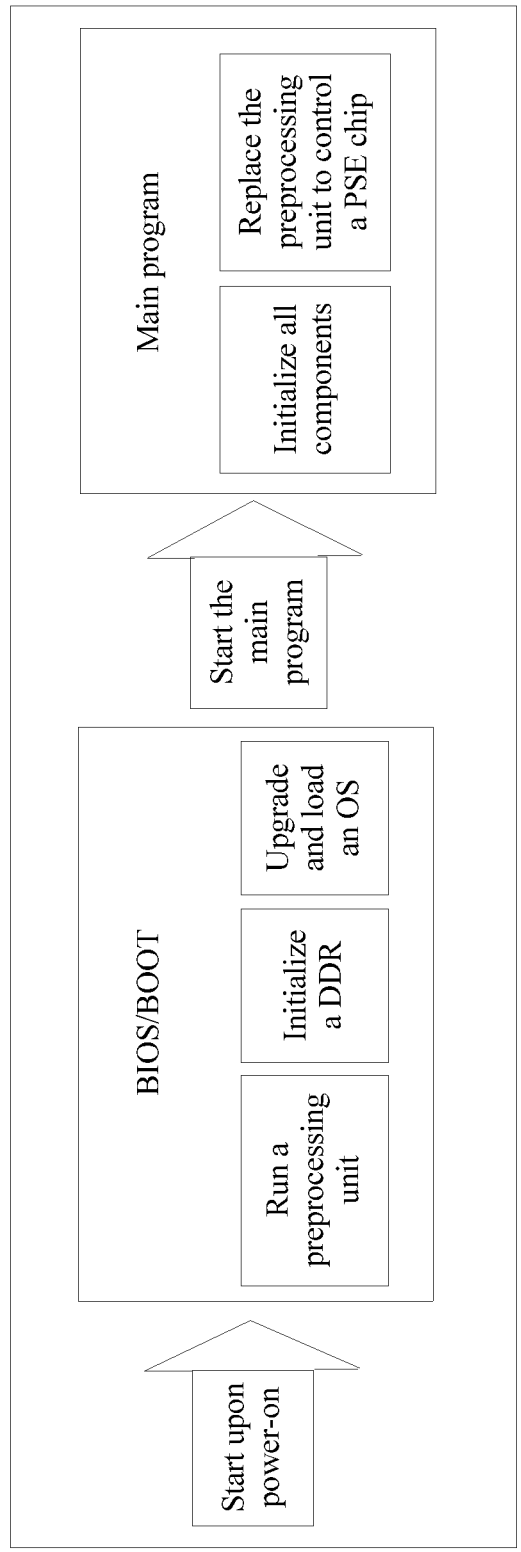
FIG. 6 is an example diagram of a startup upon power-on process of Ethernet PSE according to the present disclosure.

FIG. 5 shows another example diagram of a system framework according to the present disclosure. A difference between the system framework shown in FIG. 5 and the system framework shown in FIG. 2 is that both a preprocessing unit and a master control unit are integrated into a master control, and the preprocessing unit may run before the master control unit runs, or run concurrently with the master control unit. Because main program startup of the master control unit is a phase that consumes a longest time, the preprocessing unit runs before the master control unit loads a main program or jumps to the main program in order to quickly power on a PD. A pre-order time for the master control unit from starting to loading the main program or jumping to the main program may be estimated in advance, and then a startup time of the preprocessing unit is set such that the preprocessing unit starts and runs before the pre-order time. FIG. 6 is an example diagram of a startup upon power-on process of PSE according to the present disclosure. A preprocessing unit and a master control unit of the PSE are integrated into a master control, and the preprocessing unit starts running before master control unit BIOS/BOOT initializes a DDR. After a main program of the master control unit starts, the master control unit replaces, after all components are initialized, the preprocessing unit to control a PSE chip. Integrating the preprocessing unit and the master control unit into the master control helps reduce a hardware device, but increases pressure on a CPU of the master control. Independently running the preprocessing unit and the master control unit in an MCU and the master control respectively increases the hardware device, but may reduce the pressure on the CPU of the master control.

Figure 7:
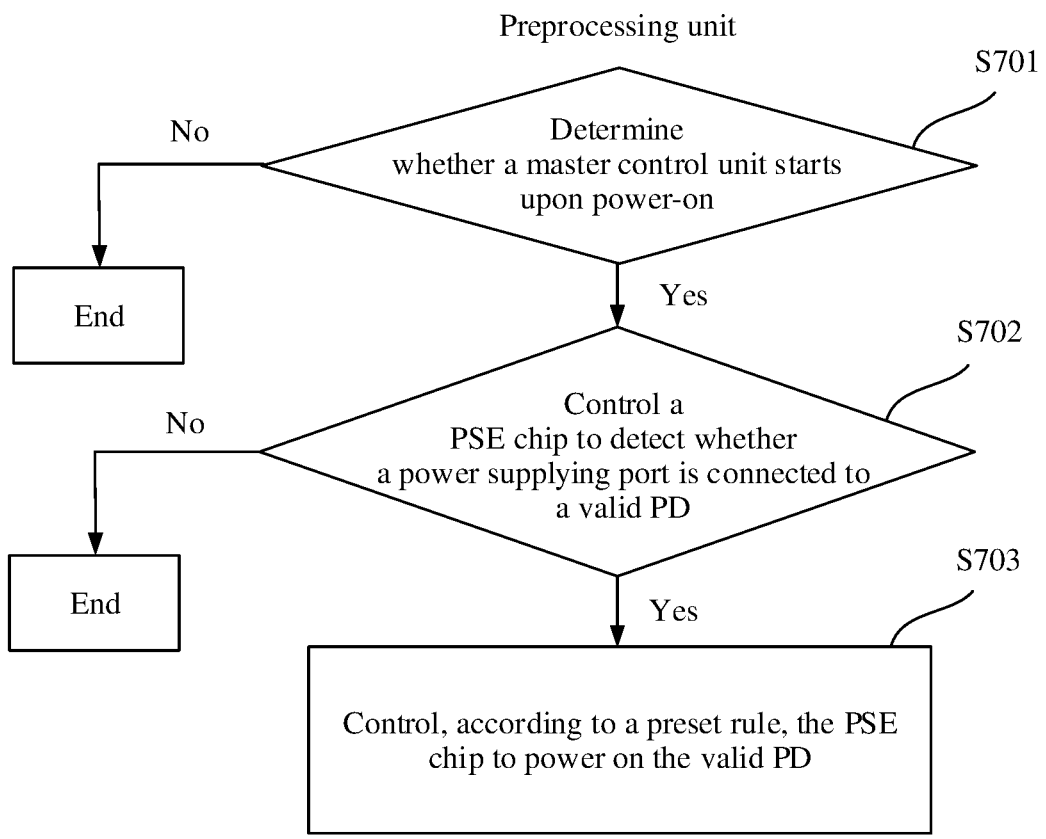
FIG. 7 is a schematic flowchart of a method for PoE according to the present disclosure.

Based on the system frameworks shown in FIG. 2 and FIG. 5, the present disclosure further provides a method for PoE. FIG. 7 is a schematic flowchart of a method for PoE. As shown in FIG. 7, the method for PoE includes the following steps.

Step S701: A preprocessing unit determines whether a master control unit starts upon power-on. If the master control unit starts upon power-on perform step S702, and if not end the process.

Step S702: Control a PSE chip to detect whether a power supplying port is connected to a valid PD. Perform step S703 when the power supplying port is connected to the valid PD, and end the process when the power supplying port is not connected to the valid PD.

Step S703: Control, according to a preset rule, the PSE chip to power on the valid PD.

Figure 8:
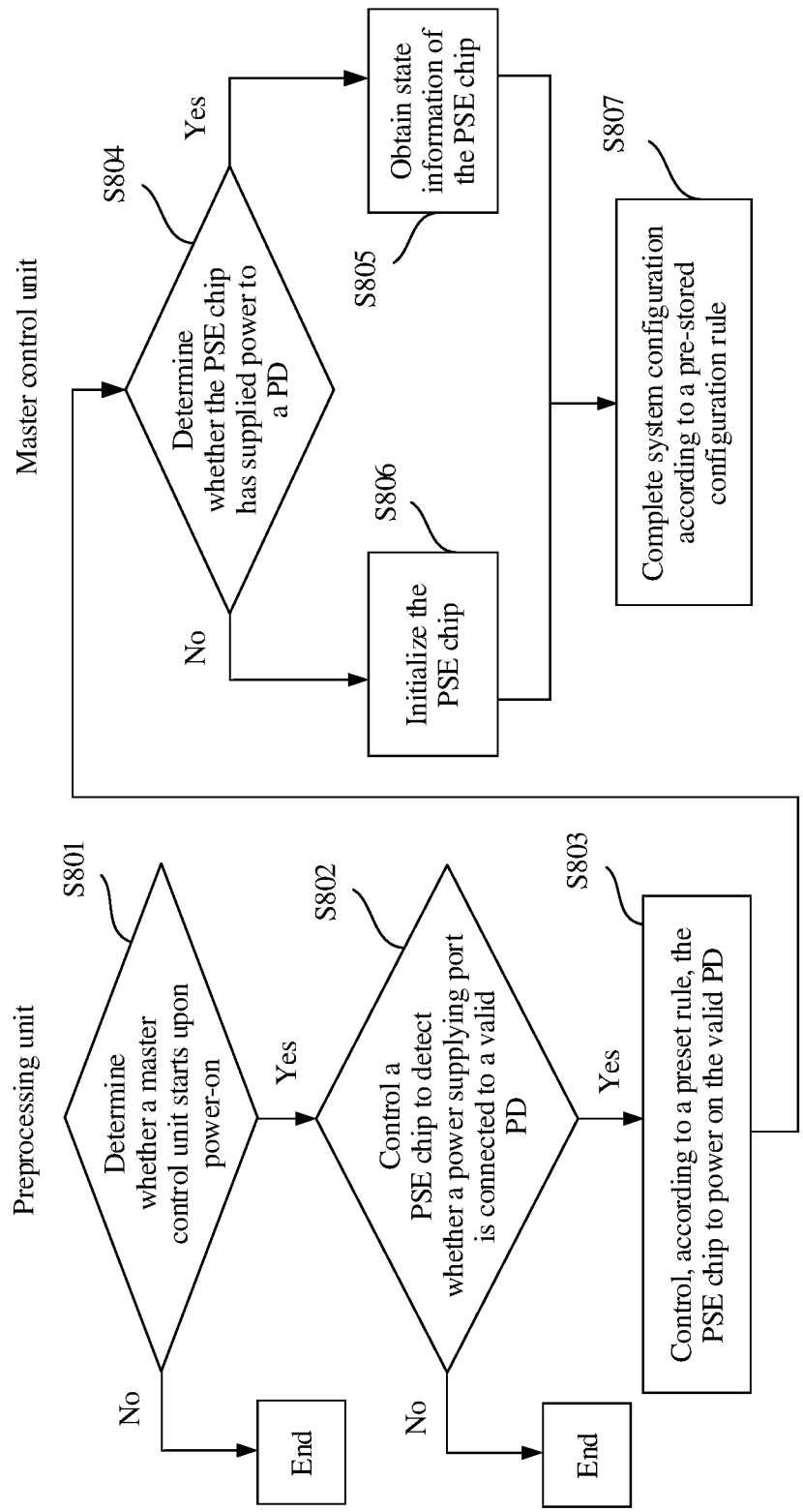
FIG. 8 is a schematic flowchart of another method for PoE according to the present disclosure.

FIG. 8 is a schematic flowchart of another method for PoE. As shown in FIG. 8, the method for PoE includes the following steps.

Step S801: A preprocessing unit determines whether a master control unit starts upon power-on. Perform step S802 if the master control unit starts upon power-on, and if not end the process.

Step S802: Control a PSE chip to detect whether a power supplying port is connected to a valid PD. Perform step S803 when the power supplying port is connected to the valid PD, and if not end the process.

Step S803: Control, according to a preset rule, the PSE chip to power on the valid PD.

The master control unit reads configuration information of the PSE chip and perform steps S804-S807.

Step S804: Determine, according to the configuration information, whether the PSE chip has supplied power to a PD.

Step S805: Obtain state information of the PSE chip if the PSE chip has supplied power to the PD.

Step S806: Initialize the PSE chip if the PSE chip has not supplied power to the PD.

Step S807: Complete system configuration according to a pre-stored configuration rule.

A volatile memory may be disposed in the master control unit, or the volatile memory may be connected to the master control unit. According to the method, the preprocessing unit may determine, by detecting whether data in the volatile memory disappears, whether the master control unit starts upon power-on. If the data in the volatile memory disappears, it indicates that the master control unit is powered off, startup performed by the master control unit is startup upon power-on, and the master control unit rewrites data into the volatile memory after startup upon power-on. The master control unit is not powered off, and startup upon power-on does not need to be performed if the data in the volatile memory always exists and does not disappear. The preprocessing unit may be connected to the master control unit, obtains a detection result of the volatile memory by the master control unit, and determines, according to the detection result, whether the master control unit starts upon power-on. Alternatively, the preprocessing unit is directly connected to the volatile memory, and the preprocessing unit determines, by detecting the data in the volatile memory, whether the master control unit starts upon power-on.

However, disposing the volatile memory increases hardware consumption, and installation is inconvenient. Therefore, the preprocessing unit obtains a logical result calculated by the connected master control unit, where the logical result is used to determine whether the master control unit starts upon power-on and is calculated by the master control unit according to a clock signal, a reset signal, a related state parameter, or the like and using a preset logical algorithm. Alternatively, the preprocessing unit obtains a clock signal, a reset signal, a related state parameter, or the like of the connected master control unit, calculates a logical result using a preset logical algorithm, and determines, according to the logical result, whether the master control unit starts upon power-on.

If the master control unit starts upon power-on, in a possible implementation, the preprocessing unit sets the PSE chip to be in a semi auto mode. In different PoE standards, the PSE chip in the semi auto mode automatically detects whether the power supplying port is connected to the valid PD, or automatically detects whether the power supplying port is connected to the valid PD, and performs physical layer classification on the valid PD. In another possible implementation, the preprocessing unit sets the PSE chip to be in a manual mode, and the preprocessing unit sends an instruction to the PSE chip to control the PSE chip to detect whether the power supplying port is connected to the valid PD. After detection is completed, the preprocessing unit may further send an instruction to the PSE chip to control the PSE chip to perform physical layer classification on the PD. For the valid PD, the PSE chip determines a power class of the valid PD. The PSE chip may specify the power class of the valid PD, or the PSE chip performs physical layer classification on the PD to determine the power class of the PD.

For the valid PD, the preprocessing unit controls, according to the preset rule, the PSE chip to power on the valid PD. If the power supply has quite high total output power and can supply power to any PD of all power supplying ports, in this case, that the preprocessing unit controls, according to the preset rule, the PSE to power on the PD may be that after the validity of the PD is detected, the PSE is controlled, directly according to a random sequence or the preset sequence or at the same time, to power on the valid PD. The preset sequence may be determined by a user according to a power supplying priority of the PD, and the power supplying priority is determined by the user according to a factor such as an importance degree of the PD or a power supplying time.

Further, controlling, according to a preset rule, the PSE chip to power on the valid PD may further include that the preprocessing unit first reads a power parameter of the power supply to obtain the total output power of the power supply, where the total output power is maximum power when the power supply can supply power to all PDs and does not include power consumption for supplying power to the PSE chip, a master control, and an MCU. After obtaining the total output power, the preprocessing unit obtains agreed power of the valid PD, and the agreed power is determined according to the power class of the PD. After obtaining the agreed power of each PD, the preprocessing unit calculates a sum of agreed power of all the PDs, determines whether the sum of the agreed power is less than or equal to the total output power of the power supply, and if the sum of the agreed power is less than or equal to the total output power, sequentially controls, according to the random sequence or the preset sequence, the PSE chip to power on the PD. The preprocessing unit may power on the PD by enabling a power supplying switch of the PSE chip, and then the PSE chip supplies power to the PD according to the agreed power of the PD. The preset sequence is determined by the user according to the power supplying priority of the PD, and the power supplying priority is determined by the user according to the factor such as the importance degree of the PD or the power supplying time. If the sum of the agreed power is greater than the total output power, the preprocessing unit determines, according to the preset sequence, whether agreed power of an $n^{th}$ PD is less than remaining power, where the remaining power=the total output power of the power supply−agreed power of all powered-on PDs. If the agreed power of the $n^{th}$ PD is less than the remaining power, the PSE chip is controlled to power on the $n^{th}$ PD, it is assumed that n=n+1, and a step of determining whether agreed power of an $n^{th}$ PD is less than remaining power is performed, that is, the foregoing determining and power-on control are performed on a next PD according to the preset sequence until all PDs whose agreed power is obtained are completely processed. n is a natural number, n=1, 2, . . . , m−1, and m is a total quantity of PDs whose agreed power is obtained by the preprocessing unit.

After a master control unit completes startup of a main program, because a basic power-on process is completed in advance by a preprocessing unit, the master control unit does not perform a conventional process of setting a PSE chip to be in a semi auto mode to power on a PD, but reads configuration information of the PSE chip and determines, according to the configuration information, whether the PSE chip has supplied power to the PD. If the PSE chip has supplied power to the PD, the master control unit obtains state information of the PSE chip as a start state for subsequently controlling the PSE chip. If the PSE chip has not supplied power to the PD, the PSE chip is initialized, which is the same as that in a case without the preprocessing unit, and then the master control unit completes entire system configuration according to a pre-stored configuration rule. The preprocessing unit no longer works after power-on of the PD is completed, and the master control unit takes over control over the PSE chip. Abundant management functions can be configured for a PoE system using the master control unit, better facilitating flexible processing of PoE system power supplying.

Figure 9:
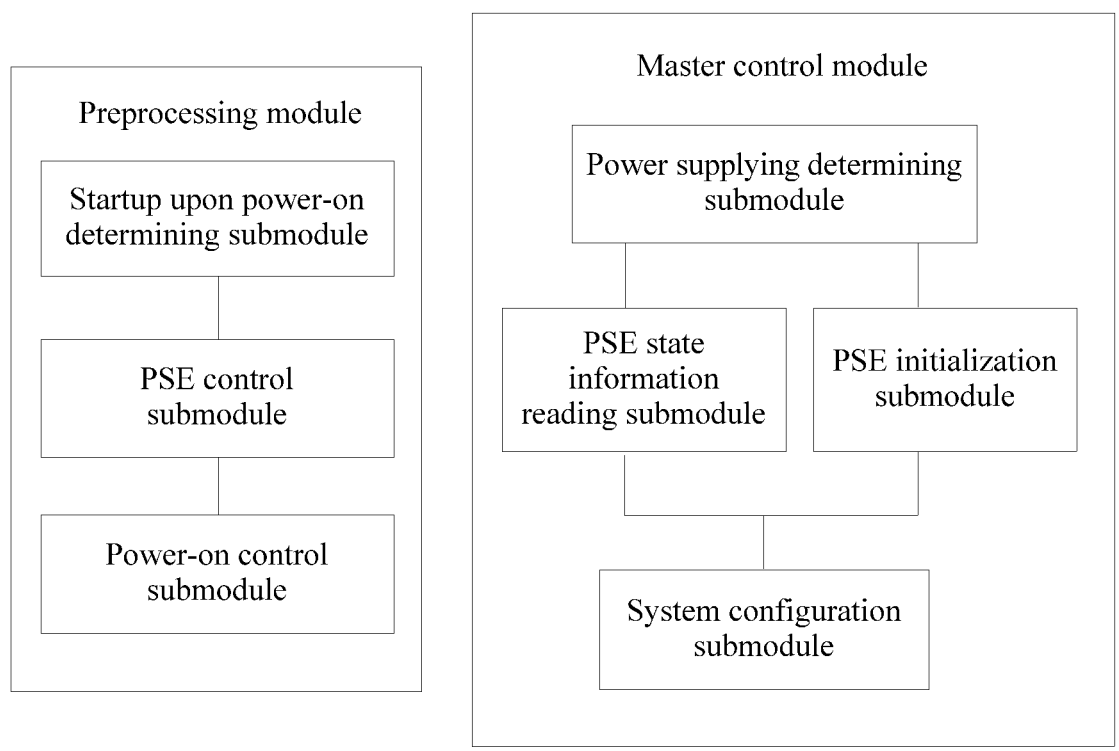
FIG. 9 is a block diagram of an apparatus for PoE according to the present disclosure.

FIG. 9 is a block diagram of an apparatus for PoE. The apparatus for PoE includes a preprocessing module and a master control module. The preprocessing module and the master control module may be both installed in a master control, or the preprocessing module is installed in an MCU and the master control module is installed in the master control.

The preprocessing module includes a startup upon power-on determining submodule configured to determine whether a master control starts upon power-on, a PSE control submodule configured to control a PSE chip to detect whether a power supplying port is connected to a valid PD if the master control starts upon power-on, and a power-on control submodule configured to control, according to a preset rule, the PSE chip to power on the valid PD when the power supplying port is connected to the valid PD.

The master control module includes a power supplying determining submodule configured to determine whether the PSE chip has supplied power to a PD, a PSE state information reading submodule configured to obtain state information of the PSE chip if the PSE chip has supplied power to the PD, a PSE initialization submodule configured to initialize the PSE chip if the PSE chip has not supplied power to the PD, and a system configuration submodule configured to complete system configuration according to a pre-stored configuration rule.

If the preprocessing module is installed in the master control, a volatile memory may be disposed in the master control. The startup upon power-on determining submodule may determine, by detecting whether data in the volatile memory disappears, whether the master control starts upon power-on. If the data in the volatile memory disappears, it indicates that the master control is powered off, startup performed by the master control is startup upon power-on, if the data in the volatile memory always exists and does not disappear, the master control is not powered off, and startup upon power-on does not need to be performed. If the preprocessing module is installed in the MCU that is independent of the master control, the master control module may detect the volatile memory. The startup upon power-on determining submodule obtains a detection result of the volatile memory by the master control module, and determines, according to the detection result, whether the master control starts upon power-on.

Disposing the volatile memory increases hardware consumption. The master control module calculates a logical result according to a clock signal, a reset signal, a related state parameter, or the like and using a preset logical algorithm, where the logical result is used to determine whether the master control starts upon power-on, and the startup upon power-on determining submodule obtains the logical result calculated by the master control module, and determines, according to the logical result, whether the master control starts upon power-on. Alternatively, the startup upon power-on determining submodule obtains a clock signal, a reset signal, a related state parameter, or the like of the master control, calculates a logical result using a preset logical algorithm, and determines, according to the logical result, whether the master control starts upon power-on. The foregoing solution can be implemented when the preprocessing module is installed in either the master control or the MCU.

The PSE control submodule may set the PSE chip to be in a semi auto mode. In different PoE standards, the PSE chip in the semi auto mode automatically detects whether the power supplying port is connected to the valid PD, or automatically detects whether the power supplying port is connected to the valid PD, and performs physical layer classification on the valid PD. The PSE control submodule may alternatively set the PSE chip to be in a manual mode, and the PSE control submodule sends an instruction to the PSE chip to control the PSE chip to detect whether the power supplying port is connected to the valid PD, or the PSE control submodule sends an instruction to the PSE chip to control the PSE chip to perform validity detection and physical layer classification on the PD. For the valid PD, the PSE chip determines a power class of the valid PD. The PSE chip may specify the power class of the valid PD, or the PSE chip performs physical layer classification on the PD to determine the power class of the PD.

When controlling, according to the preset rule, the PSE chip to power on the valid PD, the power-on control submodule first reads a power parameter of the power supply to obtain total output power of the power supply, where the total output power is maximum power when the power supply can supply power to all PDs. After the total output power is obtained, the power-on control submodule obtains agreed power of a PD connected to the power supplying port, and the agreed power is determined according to a power class of the PD. After obtaining the agreed power of each PD, the power-on control submodule calculates a sum of agreed power of all the PDs, determines whether the sum of the agreed power is less than or equal to the total output power of the power supply, and if the sum of the agreed power is less than or equal to the total output power, sequentially controls, according to a random sequence or a preset sequence, the PSE chip to power on the PD. The power-on control submodule may power on the PD by enabling a power supplying switch of the PSE chip, and then the PSE chip supplies power to the PD according to the agreed power of the PD. The preset sequence is determined by a user according to a power supplying priority of the PD, and the power supplying priority is determined by the user according to a factor such as an importance degree of the PD or a power supplying time. If the sum of the agreed power is greater than the total output power, the power-on control submodule determines, according to the preset sequence, whether agreed power of an $n^{th}$ PD is less than remaining power, where the remaining power=the total output power of the power supply−agreed power of all powered-on PDs. If the agreed power of the $n^{th}$ PD is less than the remaining power, the PSE chip is controlled to power on the $n^{th}$ PD, it is assumed that n=n+1, and a step of determining whether agreed power of an $n^{th}$ PD is less than remaining power is performed until all PDs whose agreed power is obtained are completely processed. n is a natural number, n=1, 2, . . . , m−1, and m is a total quantity of PDs whose agreed power is obtained by the preprocessing unit.

If the power supply has quite high total output power and can supply power to any PD of all ports of the PSE chip, in this case, that the power-on control submodule controls, according to the preset rule, the PSE to power on the valid PD may alternatively be that after the validity of the PD is detected, the PSE is controlled, directly according to the random sequence or the preset sequence or at the same time, to power on the valid PD. The preset sequence may be determined by the user according to the power supplying priority of the PD, and the power supplying priority is determined by the user according to the factor such as the importance degree of the PD or the power supplying time.

The preprocessing module and the master control module may be both installed in the master control and executed by the master control. The preprocessing module may be executed before the master control module is executed, or is executed concurrently with the master control module. Because main program startup of the master control module consumes a longest time, the preprocessing module is executed before the master control module loads a main program or jumps to the main program in order to quickly power on the PD. A pre-order time for the master control module from starting to loading the main program or jumping to the main program may be estimated in advance, and then a startup time of the preprocessing module is set such that the preprocessing module starts and runs before the pre-order time. Alternatively, the master control module may be installed in the master control, and the preprocessing module is installed in the MCU that is independent of the master control. The preprocessing module and the master control module are executed separately, and the preprocessing module is executed by the MCU after the master control starts upon power-on. Therefore, the apparatus for PoE does not need to wait for a process such as obtaining a startup file by the master control module, loading an OS from the startup file, starting a main program, or initializing all components by the main program, and the PD can be quickly powered on. In addition, abundant management functions can be configured for a PoE system using the master control module, and flexibility and efficiency of PoE system power supplying management can be increased.

After a master control module completes startup of a main program, because a basic power-on process is completed in advance by a preprocessing module, the master control module does not perform a conventional process of setting a PSE chip to be in a semi auto mode to power on a PD. Instead, a power supplying determining submodule reads configuration information of the PSE chip and determines, according to the configuration information, whether the PSE chip has supplied power to the PD. If the PSE chip has supplied power to the PD, a PSE state information reading submodule obtains state information of the PSE chip as a start state for subsequently controlling the PSE chip. If the PSE chip has not supplied power to the PD, a PSE initialization submodule initializes the PSE chip, which is the same as that in a case without the preprocessing module, and then a system configuration submodule completes entire system configuration according to a pre-stored configuration rule. The preprocessing module no longer works after power-on of the PD is completed, and the master control module takes over control over the PSE chip.

A person skilled in the art may clearly understand that, the technologies in the embodiments of the present disclosure may be implemented by software in addition to a necessary general hardware platform. Based on such an understanding, the technical solutions of the present disclosure essentially or the part contributing to the other approaches may be implemented in a form of a software product. The software product is stored in a storage medium, such as a read-only memory (ROM)/random access memory (RAM), a hard disk, or an optical disc, and includes several instructions for instructing a computer device (which may be a personal computer, a server, or a network device) to perform the methods described in the embodiments or some parts of the embodiments of the present disclosure.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate a device for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction device. The instruction device implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly, for related parts, refer to partial descriptions in the method embodiment.

The foregoing descriptions are implementations of the present disclosure, but are not intended to limit the protection scope of the present disclosure. Any modification, equivalent replacement, and improvement made without departing from the principle of the present disclosure shall fall within the protection scope of the present disclosure.

What is claimed is:

1. A power sourcing equipment (PSE), comprising:
   a PSE chip;
   a master control processor coupled to the PSE chip, wherein the master control processor is configured to:
      run BOOT of a basic input/output system (BIOS) during the master control processor starting upon power-on;
      execute a main program during the master control processor starting upon power-on;
      determine whether the PSE chip has supplied power to a powered device (PD) after completing the master control processor starting upon power-on;
      obtain state information of the PSE chip when the PSE chip has supplied power to the PD;
      use the state information as a start state for subsequently controlling the PSE chip; and
      initialize the PSE chip when the PSE chip has not supplied power to the PD;
   a power supplying port coupled to the PSE chip; and
   a preprocessor coupled to the master control processor and the PSE chip, wherein the preprocessor is configured to perform the following during the master control processor starting upon power-on:
      determine whether the master control processor starts upon power-on;
      set the PSE chip to a manual mode;
      control the PSE chip to detect whether the power supplying port is connected to a valid PD; and
      control, according to a preset rule, the PSE chip to power on the valid PD when the power supplying port is connected to the valid PD.

2. The PSE of claim 1, wherein the preprocessor is configured to:
   obtain total output power for a plurality of PDs;
   obtain agreed power of each of the PDs;
   determine a to-be-powered-on PD according to the total output power and the agreed power of each of the PDs; and
   control the PSE chip to power on the to-be-powered-on PD.

3. The PSE of claim 1, further comprising a master control chip, wherein the preprocessor and the master control processor are configured to run in the master control chip, and wherein the preprocessor is further configured to run before the master control processor loads the main program.

4. The PSE of claim 1, further comprising a master control chip, wherein the preprocessor and the master control processor are configured to run in the master control chip, and wherein the preprocessor is further configured to run before the master control processor skips to the main program.

5. The PSE of claim 1, further comprising a master control chip, and wherein the master control processor is configured to run in the master control chip, wherein the preprocessor is configured to run in a microcontroller independent of the master control chip, and wherein the microcontroller is connected to a power supply and the PSE chip.

6. The PSE of claim 1, further comprising a volatile memory disposed in the master control processor, wherein the master control processor is configured to detect whether data in the volatile memory disappears to obtain a detection result, and wherein the preprocessor is further configured to determine whether the master control processor starts upon power-on based on the detection result.

7. The PSE of claim 1, further comprising a volatile memory, coupled to the master control processor, wherein the master control processor is configured to detect whether data in the volatile memory disappears to obtain a detection result, and wherein the preprocessor is further configured to determine whether the master control processor starts upon power-on based on the detection result.

8. The PSE of claim 1, further comprising a volatile memory disposed in the master control processor, and wherein the preprocessor is configured to:

detect whether data in the volatile memory disappears to obtain a detection result; and determine whether the master control processor starts upon power-on based on the detection result.

9. The PSE of claim 1, further comprising a volatile memory coupled to the master control processor, and wherein the preprocessor is configured to:

detect whether data in the volatile memory disappears to obtain a detection result; and determine whether the master control processor starts upon power-on based on the detection result.

10. The PSE of claim 1, wherein the master control processor is configured to calculate, using a preset logical algorithm, a logical result according to a clock signal, a reset signal and a related state parameter of the master control processor, and wherein the preprocessor is further configured to:

obtain the logical result from the master control processor; and determine according to the logical result, whether the master control processor starts upon power-on.

11. The PSE of claim 1, wherein the preprocessor is further configured to:

calculate, using a preset logical algorithm, a logical result according to a clock signal, a reset signal and a related state parameter of the master control processor; and determine according to the logical result, whether the master control processor starts upon power-on.

12. A method for power over Ethernet (PoE) implemented by an Ethernet power sourcing equipment (PSE), wherein the method comprises:

determining, by a preprocessor, whether a master control processor starts upon power-on, wherein the Ethernet PSE comprises the preprocessor, the master control processor, a PSE chip and a power supplying port;

controlling, by the preprocessor when the master control processor starts upon power-on, the PSE chip to detect whether the power supplying port is connected to a valid powered device (PD);

controlling, by the preprocessor according to a preset rule, the PSE chip to power on the valid PD when the power supplying port is connected to the valid PD;

running, by the master control processor, BOOT of a basic input/output system (BIOS) during the master control processor starting upon power-on;

executing a main program during the master control processor starting upon power-on;

determining, by the master control processor, whether the PSE chip has supplied power to a PD after completing the master control processor starting upon power-on;

obtaining, by the master control processor, state information of the PSE chip when the PSE chip has supplied power to the PD;

using, by the master control processor, the state information as a start state for subsequently controlling the PSE chip; and initializing, by the master control processor, the PSE chip when the PSE chip has not supplied power to the PD.

13. The method for PoE of claim 12, wherein controlling the PSE chip to power on the valid PD comprises:

obtaining, by the preprocessor, total output power for a plurality of PDs;

obtaining, by the preprocessor, agreed power of each of the PDs;

determining, by the preprocessor, a to-be-powered-on PD from each of the PDs according to the total output power and the agreed power of each of the PDs; and controlling, by the preprocessor, the PSE chip to power on the to-be-powered-on PD.

14. The method for PoE of claim 12, wherein determining whether the master control processor starts upon power-on comprises:

detecting, by the preprocessor, whether data in a volatile memory disappears, wherein the volatile memory is disposed in the master control processor; and determining, by the preprocessor, whether the master control processor starts upon power-on based on the detecting.

15. The method for PoE of claim 12, wherein determining whether the master control processor starts upon power-on comprises:

detecting, by the preprocessor, whether data in a volatile memory disappears, wherein the volatile memory is coupled to the master control processor; and determining, by the preprocessor, whether the master control processor starts upon power-on based on the detecting.

16. The method for PoE of claim 12, wherein determining whether the master control processor starts upon power-on comprises:

calculating, by the preprocessor using a preset logical algorithm, a logical result according to a clock signal, a reset signal and a related state parameter of the master control processor; and determining, by the preprocessor, according to the logical result, whether the master control processor starts upon power-on.

17. The method for PoE of claim 12, wherein determining whether the master control processor starts upon power-on comprises:

calculating, by the master control processor using a preset logical algorithm, a logical result according to a clock signal, a reset signal and a related state parameter of the master control processor; and determining, by the preprocessor, according to the logical result, whether the master control processor starts upon power-on.

18. The method for PoE of claim 12, wherein the PSE comprises a master control chip, wherein the method further comprises running the preprocessor before the master control processor loads the main program, and wherein the preprocessor and the master control processor run in the master control chip.

19. The method for PoE of claim 12, wherein the PSE comprises a master control chip, wherein the method further comprises running the preprocessor before the master control processor skips to the main program, and wherein the preprocessor and the master control processor run in the master control chip.

20. The method for PoE of claim 12, wherein the PSE comprises a master control chip, wherein the method further comprises running the preprocessor in a microcontroller independent of the master control chip, wherein the master control processor runs in the master control chip.

* * * * *

UNITED STATES PATENT AND TRADEMARK OFFICE
CERTIFICATE OF CORRECTION

PATENT NO. : 10,666,447 B2
APPLICATION NO. : 15/782598
DATED : May 26, 2020
INVENTOR(S) : Ling He It is certified that error appears in the above-identified patent and that said Letters Patent is hereby corrected as shown below:

Page 2, Other Publications: Line 7, "2017-198117, English Translation Df Japanese" should read "2017-198117, English Translation of Japanese"

Signed and Sealed this
Fourteenth Day of July, 2020

Andrei Iancu
*Director of the United States Patent and Trademark Office*